March 18, 1969  R. PARKER  3,433,051
APPARATUS FOR DETERMINING MECHANICAL AND THERMAL
PROPERTIES OF METALS
Filed Feb. 28, 1966  Sheet 2 of 2

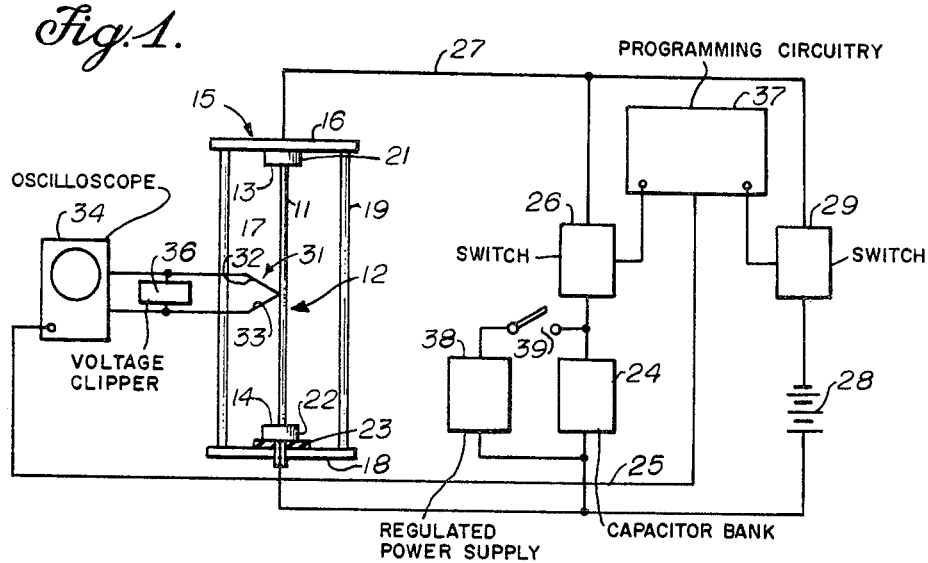
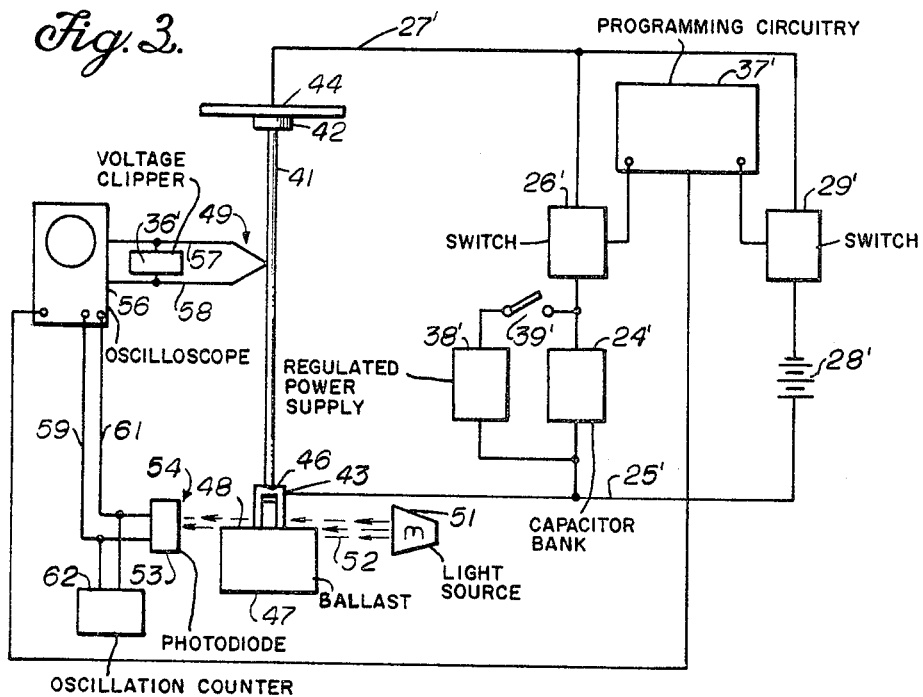

INVENTOR.
ROBERT PARKER
BY
ATTORNEY

United States Patent Office 3,433,051
Patented Mar. 18, 1969

3,433,051
APPARATUS FOR DETERMINING MECHANICAL AND THERMAL PROPERTIES OF METALS
Robert Parker, Danville, Calif., assignor to the United States of America as represented by the United States Atomic Energy Commission
Filed Feb. 28, 1966, Ser. No. 532,541
U.S. Cl. 73—15
Int. Cl. G01n 25/18
1 Claim

ABSTRACT OF THE DISCLOSURE

Apparatus for determining mechanical properties of material by substantially instantaneously heating it by discharge of a predetermined charge of electrical energy and immediately thereafter monitoring resultant changes.

---

The present invention relates to the determination of mechanical and thermal properties of electrically conductive materials and, more particularly, to an apparatus wherein an electrically conductive specimen is heated substantially instantaneously and changes in state of the specimen are immediately thereafter monitored.

Heretofore the determination of thermal and mechanical properties of metals involved relatively slow conductive heating of a specimen with subsequent monitoring of specimen changes of state, for example, calorimetric techniques in which the specimen is heated to a selected high temperature and dropped in a bath maintained at a lower temperature used in determining specific heats, and the like.

In accordance with the present invention, a specimen is substantially instaneously heated as by discharge therethrough of a predetermined charge of electrical energy and immediately thereafter, monitoring resultant thermal and/or dimensional changes requisite to determination of particular properties. High accuracy over wide temperature ranges and under highly adverse conditions is easily and rapidly obtained.

Accordingly, it is an object of this invention to provide apparatus for determining thermal and mechanical properties of conductive materials, for determining the thermal and mechanical properties of conductive specimens with improved accuracy over a wide range of specimen temperatures, a method for simultaneously determining the thermal and mechanical properties of a conductive specimen in a single simple sequential operation, and for internally applying a force to a conductive material in a manner effective to minimize occurrence of externally interfering wave forms which cause inaccurate results.

Other objects and features of advantage of the invention will be apparent in the following description and accompanying drawings in which:

FIGURE 1 illustrates a test fixture and electrical circuit of apparatus for determining the thermal properties of a conductive specimen in accordance with the invention;

FIGURE 3 illustrates a test fixture and electrical circuit of apparatus determining mechanical properties of a conductive specimen;

Figure 4:
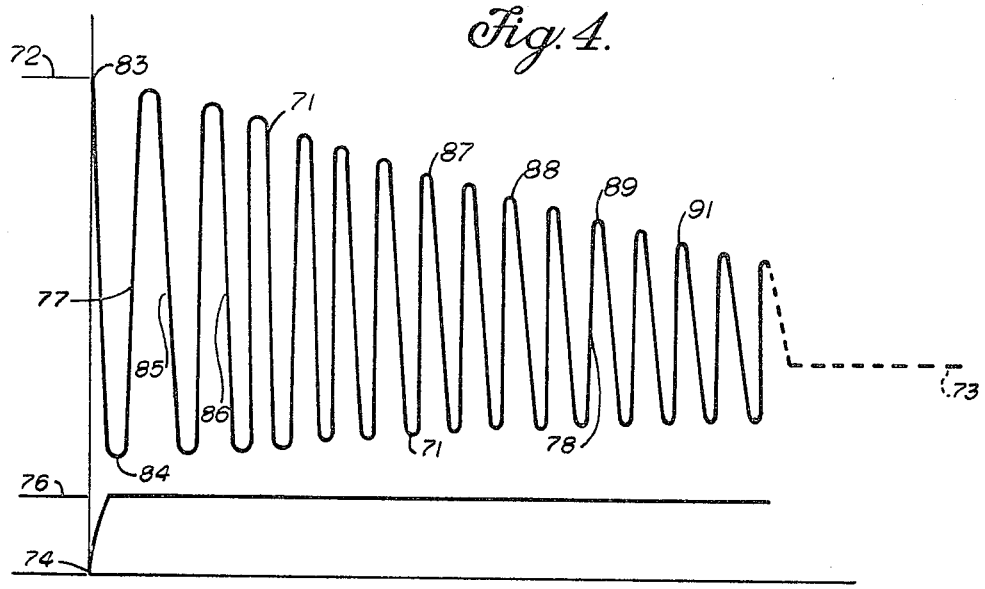

FIGURE 4 graphically illustrates a dual oscilloscope trace in which trace (a) is an electrical signal corresponding to the dimensional oscillation of a conductive specimen produced by instantaneous heating of the specimen and trace (b) is an electrical signal corresponding to the temperature of the specimen during said dimensional oscillation.

Properties which can be determined by the present method include, inter alia: specific heat, heat of phase transformation, phase transformation temperature, coefficient of thermal expansion, Young's modulus of elasticity, and internal damping factor.

More particularly, determination of thermal properties of a material may be made utilizing a specimen 11 as shown in FIGURE 1. Specimen 11 generally includes an elongated uniform cross sectional area central portion 12 to provide uniform heating with ends 13, 14 which may be of similar or enlarged dimension. The specimen 11 may be of any electrically conductive material, particularly metals in general including low melting point in highly refractory metals exemplified by titanium. The thickness of central portion 11 is preferably of the order of one third of the "skin depth" associated with the rise time of the applied electrical current as defined in "The International Dictionary of Physics and Electronics" second edition. The rise time and related "skin depth" is dependent on circuit constants with a typical suitable capacitor bank with, for example, a capacitance of 14.4 microfarads, and inductance of the order of 200 nanohenrys, chargeable to accurate voltages of 1–20,000 volts, and a resistance of the entire capacitor bank and associated circuit of approximately 0.5 ohm, the "skin depth" of pure titanium is approximately 0.07 inch. Specimen 11 is disposed in a fixture frame 15 constructed of members 16, 17, 18, 19 or in an equivalent rigid support structure. Means for applying an electrical current to specimen 11 may take the form of sockets or jaw clamps 21, 22 carried by frame members 16, 18, engaging specimen ends 12, 13 respectively. Members 16–19 may be of insulating material or insulation spacer 23 can be used to isolate at least socket 22 from frame 11, if metallic, to assure that all of the current traverses specimen 11.

The electrical current required to heat specimen 11 substantially instantaneously may be supplied by a capacitor bank 24 which should have a rise time of, at most, a few microseconds, but preferably in the nanosecond range, of which an example has been given above. With such a rapid rise time and corresponding heating rate, the need to compensate for the time of heating and extraneous heat loss effects are substantially eliminated and highly precise determinations can then readily be made. Current from bank 24 is applied to specimen 11 through conductor 25 attached to socket 22 and through conductor 27, connected to socket 21 by means of switch means 26, as in conventional capacitor energy bank practice using ignitrons or solenoid vacuum switches. To provide a predetermined initial temperature of specimen 11, a resistive heating current source 28, e.g., a 30 volt, 20 amp direct current power supply, is arranged for connection in series therewith through conductors 25, 27 by switch means 29, e.g., a high voltage solenoid vacuum switch which is opened just prior to actuation of switch 26 to avoid discharge of bank 24 through source 28.

For observing the temperature of specimen 11, a thermocouple 31, or an equivalent low thermal inertia temperature measuring means is affixed to central length portions thereof. For example, chromel, alumel leads 32 and 33 are joined preferably at the center of specimen 11 to provide couple 31 of shortest maximum time response characteristics as by spot welding leads 29 and 31 to specimen 11 at points spaced of the order of 0.0625 inch.

Leads 29 and 31 should be of minimum diameter, less than about 0.003 inch to minimize thermocouple mass available to absorb energy from specimen 11.

An oscilloscope 34 or equivalent means is connected to thermocouple leads 32, 33 for monitoring the thermocouple output temperature signal. Application of an excessive voltage pulse generated by discharge current in specimen 11 to oscilloscope may be avoided by utilizing a voltage clipper device 36, i.e., a biased diode, coupled between leads 32, 33. Device 36 may be of the type described in "Pulse and Digital Circuits," McGraw-Hill, New York, 1956 (pp. 111–117).

Programming circuitry 37 of conventional design may be employed to actuate switches 26, 29 and trigger oscilloscope 34 as required in operation described hereinafter or similar manual or sequential interlock circuits can be used. Such programmer is conveniently arranged to cause closure of switch 26 momentarily, e.g., 2 milliseconds, after switch 29 is opened, and to simultaneously trigger oscilloscope 34 with closure of switch 26, e.g., utilizing a voltage or current detecting probe (not shown) to coincide, with discharge of bank 24 through specimen 11. Programmers of the foregoing type are extensively used in similar applications well known in the accelerator and controlled fusion device art. To avoid error arising from oxidation, specimen 11 and supporting fixture 15 may be disposed in an enclosure (not shown) evacuable to as low as $10^{-6}$ mm. of mercury or which is provided with an inert gas atmosphere.

Capacitor bank 24 is charged from a variable, regulated power supply 38 as by closing switch 39 to apply, for example, an accurate voltage in the range of 1 to 20,000 volts thereon. By controlling the charge voltage accurately, e.g., to ±1 volt at the high voltage level, and correlativetly at low levels, the charge in bank 24 is accurately determined and an accurately known and reproducible heating discharge current is applied to specimen 11 in a substantially instantaneous manner. The quantity of heat delivered to the specimen is easily calculated since the quantity of electrical energy in joules, E, is determined by the formula:

$$E = \tfrac{1}{2}CV^2 \left( \frac{R_s}{R_s + R_b} \right)$$

E—Energy, in joules
C—Bank capacitance, in microfarads
V—Voltage (of capacitor bank), in volts
$R_s$—Specimen resistance, in ohms
$R_b$—Bank and circuit resistance, in ohms (For conversion to calories, one joule equals 0.2389 calorie.) Procedural methods for determining thermal properties in accordance with the invention will now be described utilizing apparatus as shown in FIGURE 1.

EXAMPLE 1A.—SPECIFIC HEAT DETERMINATION

Initially, for calibration of the system, specimen 11 is replaced by a bus bar having a known low resistance, e.g., a copper bus bar having a resistance of 5 milliohms, and a known voltage and determined amount of energy, e.g., 0.5 kv., is discharged from capacitor bank 23 therethrough to determine the resistance $R_b$ of the capacitor bank and the remainder of the circuit, 0.025 ohm being typical of one practical apparatus.

For example, $R_b$ can be determined by replacing the entire vacuum chamber and specimen with a large copper bus bar of very small resistance as noted above. The bank is then fired and the voltage decay monitored. Since the circuit is an underdamped R–L–C circuit, the R–L–C constants may be determined. $R_s$, the specimen resistance, is measured, e.g., with a Wheatstone bridge before each pulse.

The frequency ω (omega) of a underdamped R–L–C circuit is:

$$\omega = \sqrt{\frac{1}{LC} - \frac{R^2}{4L^2}} = \beta, \text{ a constant}$$

where:

ω is the frequency, in radians/second
L is bank inductance, in microhenrys
C is bank capacitance, in microfarads
R is the bank and circuit resistance, in ohms Since $R^2/4L^2$ is small, $$\omega = \sqrt{\frac{1}{LC}}$$

As ω is also given by $$\omega = \frac{2\pi}{t}$$

where $t$ is the period (or time between each peak amplitude) in microseconds,
then $$L = \frac{t^2}{4\pi^2 C}$$

The voltage decay is $$V = ke^{-(R/2L)t} \sin \beta t$$

Using a log decrement, one may measure the amplitude decay and calculate the resistance $R_b$ as $$R_b = \left( In \frac{V_1}{V_2} \right) \frac{1}{\Delta T} \frac{1}{2L}$$

where $V_1$ and $V_2$ are consecutive peak voltages of any two consecutive cycles.

Titanium specimen 11, for example, having a known mass, e.g., 0.1 gram, and known resistance, $R_s$, is then placed in clamps 21 and 22 and D-C source 28 is activated to achieve a selected equilibrium base temperature providing a desired metallurgical phase level in the specimen for which the specific heat is to be determined, e.g., 827° C., the alpha phase of pure titanium metal. Capacitor 23 is charged to a predetermined voltage level, e.g., 1.0 kv., by closing switch 39. Thereafter, the predetermined amount of energy in capacitor 23 is discharged through specimen 11, and the resultant temperature rise is measured by thermocouple 28 as monitored by oscilloscope 32. The temperature of specimen 11 is then raised incrementally to a second elevated temperature in the range at which the desired phase exists. For example, to heat specimen 11 from 827° to 865° C., energy of the order of 0.7 kv. is discharged from capacitor energy source 23 through specimen 11. The specific heat of titanium specimen 11, in its alpha phase, can then be calculated from the known mass, the achieved temperature rise and the incremental amount of electrical energy resistively dissipated therein to produce the temperature rise.

Specific heat ($C_{10}$) may be calculated in calories per gm.-mole ° C. by:

$$C_p = (0.239) \left( \frac{CV^2}{2} \right) \left( \frac{R_s}{R_b + R_s} \right) \frac{1}{\Delta Tm}$$

For example, where (for the alpha phase of the above-mentioned titanium specimen)

C=14.4 microfarads
V=500 volts
$R_s$=0.4 ohm
$R_b$=0.022 ohm
ΔT=20 centigrade degrees
m=0.1 gram then $C_p$=0.205 calories/gm. ° C. at 840° C.

The specific heat for other phases of the specimen, e.g., the beta phase, is determined by following the same procedure as set forth hereinabove except that a base equilibrium temperature, e.g., 887° C., in the titanium beta phase region is to be achieved by means of D-C source 26. Capacitor 23 is charged to a predetermined voltage level, e.g., 0.53 kv., sufficient to heat specimen 11 to a given higher temperature within the selected phase, region e.g., 907° C.

EXAMPLE 1B.—LATENT HEAT OF PHASE TRANSFORMATION

In the determination of the latent heat of phase transformation, a series of discharge heating steps as described in Example 1A are conducted on a specimen 11, e.g., of titanium being transformed from alpha to beta phase. Specimen 11 is brought to equilibrium at a base temperature in the upper portion of the alpha phase temperature range, e.g., 827° C. Successive incrementally increased heating charges of selected magnitude are applied to heat specimen 11 from the determined base temperature to a plurality of at least two and preferably three or more temperature points within each of a first phase, an adjoining phase, and the phase region defining the transition temperature between said adjacent phases, e.g., the alpha phase, beta phase, and alpha-beta transition region of the titanium material of specimen 11.

Using a specimen of 0.10 gram, C=14.4 microfarads, L=200 nanohenrys, $R_b$=0.0022 ohm, $R_s$=0.4 ohm, and a series of discharge energies which were substantially, instantaneously, sequentially discharged through specimen 11, the temperature of specimen 11 was equilibrated at a selected base temperature of 827° C. and the second column illustrates the resultant temperatures achieved within specimen 11.

Table I

| Discharge energy, (kv.) | Achieved temperature, (° C.) |
|---|---|
| 0 | 827 |
| 0.5 | 847 |
| 0.6 | 853 |
| 0.7 | 864 |
| 0.8 | 874 |
| 1.0 | 878 |
| 1.1 | 880 |
| 1.2 | 882 |
| 1.3 | 887 |
| 1.4 | 905 |
| 1.5 | 928 |

By plotting all points of Table I, three substantially straight line curves result, one corresponding to the alpha phase region, one to the alpha-beta transformation region, and the third to the beta phase region. The two points of intersection between these three lines represent respectively the temperature at which alpha-beta phase transformation commences and the temperature at which that transformation is complete, and the energy required to provide same is that required to produce the temperature change between said two points.

The temperature points within the alpha phase region, i.e., below approximately 870° C., form a substantially straight line, while temperature points in the beta phase region, e.g., 875–880° C., form a substantially straight line of lesser slope, displaced downwardly from the first, providing an angular discontinuity therebetween, corresponding to the phase transformation temperature. By extending the alpha phase curve above the curve representing the alpha to beta phase change, the latent heat of phase transformation is determined from the area between the two abovementioned curves, for example, area 40 of FIG. 2.

A second embodiment, shown in FIGURE 3 of the drawings, illustrates other methods of employing the teachings of the invention.

Herein is employed a specimen 41 of conductive material similar to specimen 11, but of a generally greater length, e.g., stainless steel wire having a diameter of 0.030" and a length of 4.5 feet, length being defined as the distance between clamps 42 and 43 which engage the ends thereof. Clamp 42 is supported by member 44 to suspend specimen 41 vertically downward therefrom. Clamp 43 conductively receives lower end 46 of specimen 41, and is further adapted to support interchangeable, segmented weight ballast 47 in free-swinging relation downward therefrom.

The top surface 48 of ballast 47 is planar and maintained substantially in normal relation to the vertical axis of specimen 41 so that the combined weight of clamp 43 and ballast 47 exert a tensile force upon specimen 41, with end 46 free to move longitudinally.

Figure 2:
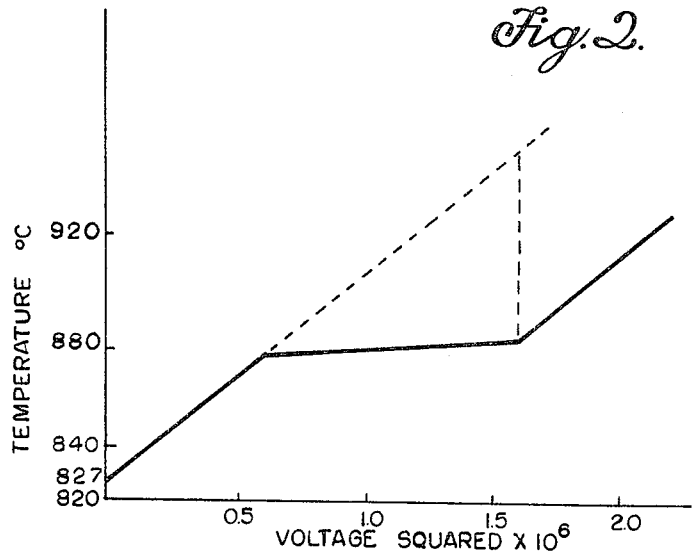
FIGURE 2 is a plot of (achieved) temperature v. discharge voltage (squared), illustrating determination of specified heat.

Components utilized in the embodiment of FIGURE 2, similar to those of FIGURE 1, are identified by reference characters. However, thermocouple 49, similar to thermocouple 31, is preferably joined to specimen 41 at approximately one-fifth the length of specimen 41 from clamp 42. To provide means for detecting longitudinal movement of specimen 46, a light source 51 is arranged to direct a focused light beam 52 horizontally therefrom, to be partially intersected by ballast 47, with the remainder of the beam passing across the upper surface 45 of ballast 47 to light detecting means such as photodiode 53. Preferably, photodiode 53 is of a high sensitivity type, such as Model SD 100, manufactured by EG&G, having a sensitivity of the order of 0.25 $\mu a./\mu w$. For convenience, light-sensitive surface 54 of photodiode 59 is disposed to receive light beam 57 with the center point of surface 61 horizontal with surface 45 of ballast 47.

Oscilloscope 56 may be similar in character and operation to oscilloscope 34 above, but is preferably of dual trace capability, adapted to receive and display a signal from thermocouple 49 by means of electrical connections 57 and 58, and to receive and display a signal from photodiode 53 by means of electrical connections 59 and 61. An evacuated or controlled atmosphere enclosure (not shown) may also be provided as above.

For making determinations, D-C light source 51 is energized to project light beam 52, as discussed above, and oscilloscope 56 is adjusted to display a selected base value for the signal received from photodiode 54 on one trace. The second trace of oscilloscope 56 is utilized to display the temperature signal from thermocouple 49, the intitial temperature of specimen 41, maintained at a selected base temperature, e.g. 100° C.

By the method described in Example 1A, the level of discharge energy necessary to raise the temperature of specimen 41 from a base temperature, e.g. 600° C., to a higher temperature, e.g. 620° C. can be determined. With switches 26' and 29' open, capacitor 24' is charged to that energy level, e.g. 0.6 kv. Switch 29' is closed, thereby permitting D-C source 28' to resistively heat specimen 41 to a selected base temperature, e.g. 600° C. The predetermined charge on capacitor bank 24' is then delivered to specimen 41 as above.

The realtively instantaneous transfer of energy to tensed specimen 41 causes a compressive inertial stress within specimen 41. The metallic specimen, being an elastic body, displays a dimensional oscillation in attempting to reach equilibrium between the tensile force caused by ballast 47 and the compressive force caused by the instantaneous energy transfer to the specimen.

The oscillation which is produced differs radically from an externally caused dimensional oscillation, e.g., such as provided by lifting the supporting of ballast 47 and suddenly dropping it, which would produce interfering waves of motion in specimen 41, resulting in inaccuracies of the dimensional oscillation. On the other hand, an internally generated dimensional oscillation within specimen 41, such as that provided by the present method, provides a pure and characteristic oscillatory motion of the specimen dependent only upon the physical properties of the specimen, with a period determined by the magnitude of ballast 47.

The temperature of specimen 41 tends to fall after termination of the discharge i.e., during the resulting dimensional oscillation. Therefore, to maintain specimen 41 at the achieved elevated temperature, D-C source 28' is preferably arranged to be re-connected in series with specimen 41, by means of switch 29' on completion of the discharge. D-C source 28' is further preferably adjusted to a predetermined energy discharge level, e.g., 60 watts, to offset thermal losses from specimen 41 by radiation, convection, etc. Other means for minimizing energy loss may be used, e.g., reflective shields (not shown).

Referring now to FIGURE 4, the dimensional oscillation of specimen 41, caused by instantaneous heating, is in the form of an under-damped periodic oscillatory curve 71, originating at level 72 and diminishing to a new level 73. Level 72 is equivalent to the dimensional length of specimen 41 under tension of ballast 47 and at the original unheated temperature, e.g. 600° C., point 74 on the temperature plot of FIGURE 4. Level 73 corresponds to the equilibrium dimensional length of specimen 41 still under tension from ballast 47, but at the elevated temperature caused by discharge of capacitor 48, e.g., 620° C., level 76 on the temperature plot of FIGURE 4.

An oscillation counter 62 (see FIG. 3) may be employed to record the period of the first ten full oscillations of specimen 41, from point 77 to point 78 of the curve. Thus, the constant period of oscillation, i.e., peak to peak, can easily and accurately be determined. More partciularly, the dimensional oscillation represented by a corresponding wave form on oscilloscope 56 may be represented by two components: first, a D-C component equivalent to the continuous change from level 72 to level 73; and secondly, an A-C component equivalent to the dimensional oscillation of specimen 41. To measure ten oscillatory cycles, oscillation counter 62 includes a D-C blocking means, such as a blocking capacitor, to remove the abovementioned D-C component and pass only the A-C or dimensional oscillation component. Oscillation counter 62 further includes a decade counter adapted to be "set" for counting upon receiving a first positive-going signal 77 as its polarity changes from negative to positive, and further adapted to provide an output signal corresponding to the tenth positive-going signal 78 thereafter as its polarity changes from negative to positive. The decade counter may be interlocked with a timing device in accord with conventional practice to determine the time elapsed during the counted oscillations.

By this method, the temperature of specimen 41 is substantially instantaneously raised to a new temperature, e.g., 620° C. Thus, the oscillatory dimensional change in specimen 41, caused by the conflicting tensile and internally generated compressive forces are dependent upon the mechanical properties of the specimen at the temperature to which it is heated, e.g., 620° C.

Various mechanical properties of specimen 41 can be determined from the generated damped curve by techniques such as those in the examples hereinafter further described.

EXAMPLE 3A.—COEFFICIENT OF THERMAL EXPANSION

To eliminate interactions of creep in the characteristics of specimen 41, the weight of ballast 47 is preferably selected of the order of 100 times the weight of specimen 41. The value of the coefficient of thermal expansion for the material of specimen 41 at the temperature to which specimen 41 is instantaneously heated corresponds to the maximum amplitude of the dimensional oscillation, i.e., the vertical distance from point 83 to point 84 of the curve of FIGURE 3.

EXAMPLE 3B.—YOUNG'S MODULUS OF ELASTICITY

Young's modulus of elasticity for the material is specimen 41 at its discharge heated temperature is determined from the time period for each oscillatory cycle, e.g., the time difference between points 85 and 86 of FIGURE 4.

Young's modulus, E, may be determined from:

$$E = 4\pi^2 \frac{Lm}{p^2 A}$$

where:

L = the length of the specimen
m = specimen mass
p = mechanical oscillation period, in seconds
A = specimen cross-sectional area

EXAMPLE 3C.—INTERNAL DAMPING FACTOR

The internal damping factor of specimen 41 at its resultant discharge heated temperature is determined from the decay rate of the generated dimensional oscillation, i.e., the relation of the maximum dimensional value of a unidirectional series of oscillation peaks, e.g., the relationship of points 87, 88, 89, 91, etc.

The internal damping factor, Q, is defined as:

$$\frac{1}{Q} = \ln\left(\frac{A_o - A_1}{A_o}\right)$$

where $A_o$ and $A_1$ are dimensionless peak values of consecutive cycles, for example, 87 and 88 on FIGURE 4.

It is to be noted that, in the second embodiment which is primarily a method of determining physical properties, the thermal properties discussed in the first embodiment can also be determined.

While the present invention has been described with particular respect to two embodiments, it is apparent that numerous modifications and variations are possible within the spirit and scope of the invention.

While the present invention has been described with particular reference to an instantaneous discharge heating of the specimen by means of a low inductance capacitor bank, other sources of electrical energy capable of similarly rapid discharge and similar discharge energy content could, in theory, be used.

The electrically conductive material or a metallic specimen may be a specimen of any uniform cross sectional area over the central length, such as flat plates, etc. It is further possible to employ irregular shaped specimens or specimens having thickness substantially greater than the "skin thickness" of the particular material if the method is adapted to allow for the resulting irregularities, i.e., by determining standard characteristics for a particular irregularly shaped specimen or for particular thickness. The method is also applicable to determining the effect on the thermal and physical properties by plating or coating the specimen with a different material, and is particularly applicable to determining properties of alloys and more particularly the properties of alloys in superheated conditions.

Still further, the present method may be practiced to determine properties such as specific heat and coefficient of thermal expansion of conductive liquids. In such methods, the conductive liquid is contained in an insulating tubular member with the contained liquid in electrically conductive relation with the discharge circuit.

The method of the present invention has been described with particular reference to two test assemblies. It is readily apparent that other fixtures and assemblies may be used. In greater particularity, the second embodiment describes a specimen which is suspended from a rigid frame assembly with a variable ballast weight suspended from the lower end of the specimen while electrical continuity is maintained with the weighted end of the specimen by a flexible wire to avoid interference with the dimensional oscillation of the specimen.

Other configurations are also possible. For example, an electrically conductive cylindrical member may be conductively disposed to the weight to extend vertically downward therefrom. Circuit continuity with the weighted end of the specimen may be provided by an annular member, preferably of graphite or tungsten, disposed in coaxial relation to the cylindrical member. By maintaining the internal diameter of the annular member approximately one-eighth inch greater than the outside diameter of the cylindrical member, electrical continuity is maintained by means of an arc-gap while permitting free vertical oscillation of the specimen, weight and cylindrical member.

Still further, it is possible to dispense with the weight and merely suspend the specimen under its own weiht. Such a method would yield usable, but less accurate, values.

Other circuits and components may also be used. For example, where a thermocouple is described for measuring the specimen temperature, it is also possible to monitor the resistance of the specimen by standard techniques. Since the resistance varies according to the temperature, the specimen temperature could be derived therefrom. Optical methods may also be employed.

While a particular technique has been described for sequential tests, i.e., raising the base temperature after each discharge heating and then discharge heating to a higher step, it is also possible to equilibrate the specimen at a constant base temperature after each discharge heating step and achieve a higher temperature on each succeeding step by discharging a sequentially greater amount of energy through the specimen. It is further possible to heat the specimen to lower temperatures or intermediate temperatures in relation to the previous steps to provide more continuous data across a particular temperature range.

The present invention has further been described with respect to particular specimen properties which are to be determined. It is also possible to determine other specimen properties by the same method. For example, by reducing to a minimum the time required to discharge the capacitor energy source and begin monitoring the specimen properties, it is possible to obtain data characteristic of such properties as the rate of phase change within the specimen. Also, the method may be applied to determine tensile yield stress by varying the balast weight or discharge temperature over a series of discharge pulses.

Other additional applications of the present invention include the testing and determination of the response characteristics of temperature sensors, strain gauges and thermocouples in environments of rapidly changing temperature or stress.

Still further, the present invention is applicable to the determination of thermal diffusivity at elevated temperatures, e.g., by uniformly pulse heating the environmentally insulated specimen across its length, providing large heat sinks at either specimen end and monitoring temperature variation time at discrete locations on the specimen.

Thus the foregoing description is not intended to limit the invention except by the terms of the following claims.

What is claimed is:
1. Apparatus for determining mechanical properties of a specimen of electrically conductive material, comprising:
 (a) means for supporting a specimen of the electrically conductive material to be tested, said specimen having substantially uniform cross-section area transverse to a longitudinal dimension of said specimen and a thickness along said longitudinal dimension of approximately one-third the electrical skin thickness of said specimen;
 (b) a high voltage capacitor bank having an inductance of less than about 100 nanohenrys disposed in electrical series connection across longitudinal dimension of said specimen;
 (c) first switching means disposed in electrical series connection with said specimen and said capacitor bank;
 (d) wherein said supporting means vertically suspends a first end of said specimen with said specimen disposed to provide free longitudinal motion and a weight having a flat horizontal surface for suspension from an end of said specimen distal said first end to produce longitudinal tensile stress in said specimen;
 (e) monitoring means comprising a light source arranged to focus light on said flat weight surface;
 (f) photodiode means disposed in receiving relation to said focused light and producing electrical current proportional to focused light impinging thereon; and
 (g) with said flat surface of said weight further disposed to bisect said focused light electrical monitoring means disposed in receiving relation to said current output from said current output from said photodiode means.

References Cited
UNITED STATES PATENTS

| 2,703,010 | 3/1955 | McEwan | 73—191 |
| 2,994,818 | 8/1961 | Harman | 324—32 |
| 3,100,252 | 8/1963 | O'Connor | 219—20 |
| 3,192,763 | 7/1965 | Smart | 73—16 |
| 3,217,537 | 11/1965 | Hager | 73—190 |
| 3,222,917 | 12/1965 | Roth | 73—15 |
| 3,289,460 | 12/1966 | Anderson | 73—17 |

RICHARD C. QUEISSER, *Primary Examiner.*

E. D. GILHOOLY, *Assistant Examiner.*

U.S. Cl. X.R.

73—16, 17, 67.2; 331—113